United States Patent
Fujita et al.

(10) Patent No.: US 6,728,472 B1
(45) Date of Patent: Apr. 27, 2004

(54) VIDEO DATA REPRODUCING DEVICE AND VIDEO DATA REPRODUCING METHOD

(75) Inventors: Hiroyuki Fujita, Kanagawa (JP); Norikazu Ito, Kanagawa (JP); Satoshi Yoneya, Kanagawa (JP); Masakazu Yoshimoto, Kanagawa (JP); Satoshi Katsuo, Kanagawa (JP); Satoshi Yutani, Kanagawa (JP); Tomohisa Shiga, Kanagawa (JP); Masaki Hirose, Kanagawa (JP); Jun Yoshikawa, Kanagawa (JP); Koichi Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/423,175

(22) PCT Filed: Mar. 4, 1999

(86) PCT No.: PCT/JP99/01056

§ 371 (c)(1),
(2), (4) Date: Jan. 18, 2000

(87) PCT Pub. No.: WO99/45708

PCT Pub. Date: Sep. 10, 1999

(30) Foreign Application Priority Data

Mar. 4, 1998 (JP) ............................................. P10-052362

(51) Int. Cl.[7] ............................ H04N 5/91; H04N 5/781; H04N 5/85
(52) U.S. Cl. ............................ 386/68; 386/125; 386/82
(58) Field of Search ............................ 386/68, 67, 70, 386/125, 124, 126, 45, 109, 111, 112, 27, 33, 1, 46, 6, 40, 82, 69; H04N 5/91, 5/85, 5/781

(56) References Cited

U.S. PATENT DOCUMENTS

| | | | |
|---|---|---|---|
| 5,282,049 A | * | 1/1994 | Hatakenaka et al. ........ 386/111 |
| 5,377,051 A | * | 12/1994 | Lane et al. ................... 386/81 |
| 6,115,536 A | * | 9/2000 | Iwasaki et al. .............. 386/106 |

FOREIGN PATENT DOCUMENTS

| | | |
|---|---|---|
| JP | 7-162851 | 6/1995 |
| JP | 8-70430 | 3/1996 |
| JP | 8-163494 | 6/1996 |
| JP | 9-163303 | 6/1997 |

* cited by examiner

*Primary Examiner*—Robert Chevalier
(74) *Attorney, Agent, or Firm*—Frommer Lawrence & Haug LLP; William S. Frommer

(57) ABSTRACT

In a video data reproducing apparatus adapted for reading out data including video data stored on plural non-linear accessible recording media by time slots allocated thereto to output those data, when the video data which has been read out from the recording medium is outputted to the external as n (n>1) times speed video data, a processing is carried out by a reproduction picture dividing section 11 such that when n is integer, output image 1 frame is divided by n, while when n is not integer, output image 1 frame is divided by m (m is integral part of n: n=m. . . . ), and such a processing is carried out by a reproduction image generating section 13 to allocate n frames or m frames of the video data which has been read out from the recording medium to the output image 1 frame divided by n or divided by m to generate reproduction image.

10 Claims, 18 Drawing Sheets

FIG.4A ONE TIME SPEED

FIG.4B THREE TIMES SPEED

VIDEO DATA REPRODUCING DEVICE AND VIDEO DATA REPRODUCING METHOD

TECHNICAL FIELD

This invention relates to a video data reproducing apparatus and a video data reproducing method, and more particularly to a video data reproducing apparatus adapted for reproducing video data at speed different from that at the time of recording and a video data reproducing method for reproducing video data at speed different from that at the time of recording.

BACKGROUND ART

In recent years, there have been increased demands to record or reproduce, at the same time, plural video/audio data from single video/audio data recording/reproducing apparatus and/or to reproduce such data while recording them, etc. unlike conventional VTR (Video Tape Recorder) with realization of multi-channel configuration of information offer by popularization of CATV (Cable Television), etc. In order to satisfy such demands, there have been popularized apparatuses called video server for recording/reproducing video/audio data by using random accessible recording media such as hard disc, etc. The above-mentioned video server is also called AV (Audio and/or Video) server.

Generally, a video server within the broadcasting station is required to have a high transfer rate of necessary data from requirements with respect to picture quality and/or sound quality and to have large capacity for the purpose of recording long time data. In view of the above, there have been made an attempt to use data recording/reproducing apparatus including plural hard disk (hereinafter referred to as HD) units for storing video/audio data and permitted to undergo parallel processing to thereby carry out realization of high speed of transfer rate and large capacity of data, and/or an attempt to further record parity data in advance to thereby have ability to ensure reliability even in the case where either one HD unit is out of order. Thus, even in the case where the required number of channels is changed by the content of program or broadcasting form that the broadcasting station attempts to provide, such an approach is employed to record, in a distributed manner, in advance, material data consisting of plural video/audio data to carry out sending of many channels at the same time, or to reproduce the same material data by many channels in the state where reproduction times are shifted to thereby construct system such as VOD (Video On Demand) or NVOD (Near Video On Demand), etc., thus making it possible to realize multi-channel video server capable of coping with wide variety of use forms.

In the data recording/reproducing apparatus used in such video server, there is used RAID (Redundant Arrays of Inexpensive Disks) technology constituted by plurality of hard disc drives (hereinafter each referred to as HDD) each consisting of plural HDs announced by the article ("A Case for Redundant Arrays of Inexpensive Disks (RAID)", ACM SIGMOND Conference, Chicago, Ill., Jun. 1–3, 1988) disclosed by Patterson, etc. in 1988.

In the above-mentioned article, RAID is classified into five RAIDs of RAID-1 to RAID-5. The RAID-1 is the system of writing the same content with respect to two HDDs. The RAID-3 is the system of recording input data with respect to plural HDDs in the state divided into data of a predetermined length, and generating parity data which is exclusive logical sum of data blocks corresponding to each other of respective HDDs to write it with respect to another HDD. The RAID-5 is the system of enlarging the division unit (block) of data to record one divisional data with respect to one HDD as data block, recording, with respect to HDD, as parity block, result (parity data) obtained by taking exclusive logical sum of data blocks corresponding to each other of respective HDDs and distributing parity blocks to other HDDs. Please reference is made to the above-mentioned article with respect to other RAIDs.

Hitherto, in such a video server, in the case where image recorded on HD is reproduced at a speed lower than one time speed, low speed reproduction is realized in such a manner that, e.g., the same frames are caused to be successively outputted (overlapped).

Moreover, in the case where reproduction image is reproduced at speed higher than one time speed, video data is thinned to take out only a portion of the video data and to discard or abandon other video data to display it.

This is because in the case where reproduction speed is n times speed, i.e., video data corresponding to n frames are reproduced for a time period during which video data corresponding to one frame is reproduced at standard speed, it is difficult to take out video data of one frame or more.

Accordingly, video data of one n-th is reproduced, i.e., only video data of one frame is reproduced and remaining video data of (n−1) frames are not reproduced.

FIGS. 1A and 1B are views showing conventional reproduction processing at the time of multiple speed. As shown in FIG. 1A, video data is displayed in order as frame 1, frame 2 . . . frame 9 in the case of one time speed. In the case of three times speed, as shown in FIG. 1B, video data is displayed in order as frame 1, frame 4, frame 7 . . . every fourth frame. It is popularly carried out to carry out such a reproduction image processing thus to display video data.

However, in the case where reproduction speed of video data reproduced as described above is high, all video data are not reproduced. Accordingly, there was the problem that frame to be searched is overlooked.

In addition, since all video data are not reproduced, there is the case where image is different by one frame so that change takes place in the entirety of image. There was the problem that it is impossible to correctly recognize image content.

For example, in the case where object moving at high speed or phenomenon instantaneously changed is recorded only by about 1~2 frames, there was the case where when video signal in which that image is recorded is reproduced in the state thinned into one n-th, it is impossible to find out object moving at high speed or phenomenon instantaneously changed so that the entire story cannot be understood.

DISCLOSURE OF THE INVENTION

In view of problems of the prior art as described above, an object of this invention is to provide a video data reproducing apparatus and a video data reproducing method capable of recognizing image content even with respect to high speed reproduction.

This invention is directed to a video data reproducing apparatus adapted for reading out data including video data stored with respect to plural non-linear accessible recording media by time slots allocated thereto to output those data, the apparatus comprising: reproduction picture dividing means such that in the case where the video data which has been read out from the recording medium is outputted to the external as n (n>1) times speed video data, when n is integer, it divides output image 1 frame by n, while when n is not integer, it divides output image 1 frame by m (m is integral part of n: n=m. . . . ); and reproduction video generating means for allocating n frames or m frames of the video data which has been read out from the recording medium to the output image 1 frame divided by n or divided by m to generate reproduction image.

In addition, this invention is directed to a video data reproducing method for reading out data including video data stored with respect to plural non-linear accessible recording media by time slots allocated thereto to output those data, the method comprising: a first step such that in the case where the video data which has been read out from the recording medium is outputted to the external as n (n>1) times speed video data, when n is integer, output image 1 frame is divided by n, while when n is not integer, output video 1 frame is divided by m (m is integral part of n: n=m. . . . ), a second step of allocating n frames or m frames of the video data which has been read out from the recording medium to the output image 1 frame divided by n or divided by m to generate reproduction image; and a third step of outputting, as n times speed video data, data indicative of the reproduction image generated at the second step.

BEST MODE FOR CARRYING OUT THE INVENTION

Best mode for carrying out this invention will be described below with reference to the attached drawings.

Figures 1A, 1B:
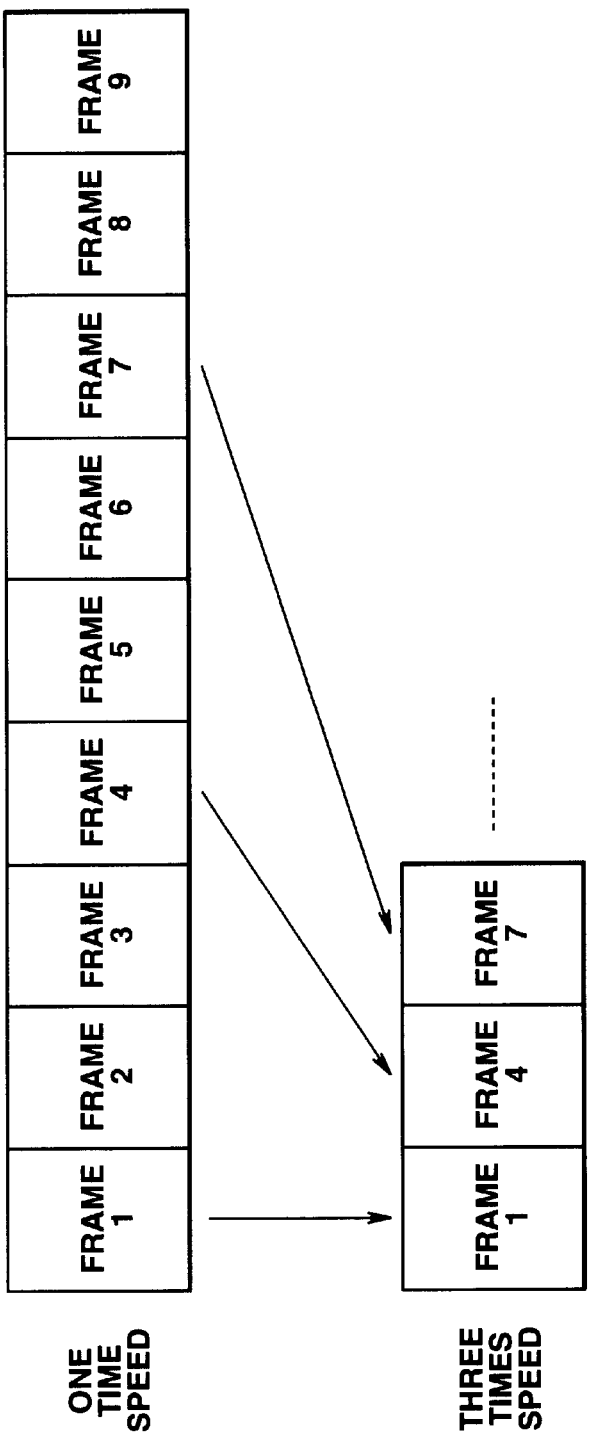
FIGS. 1A and 1B are views showing conventional reproduction processing at the time of multiple speed.
Figure 2:
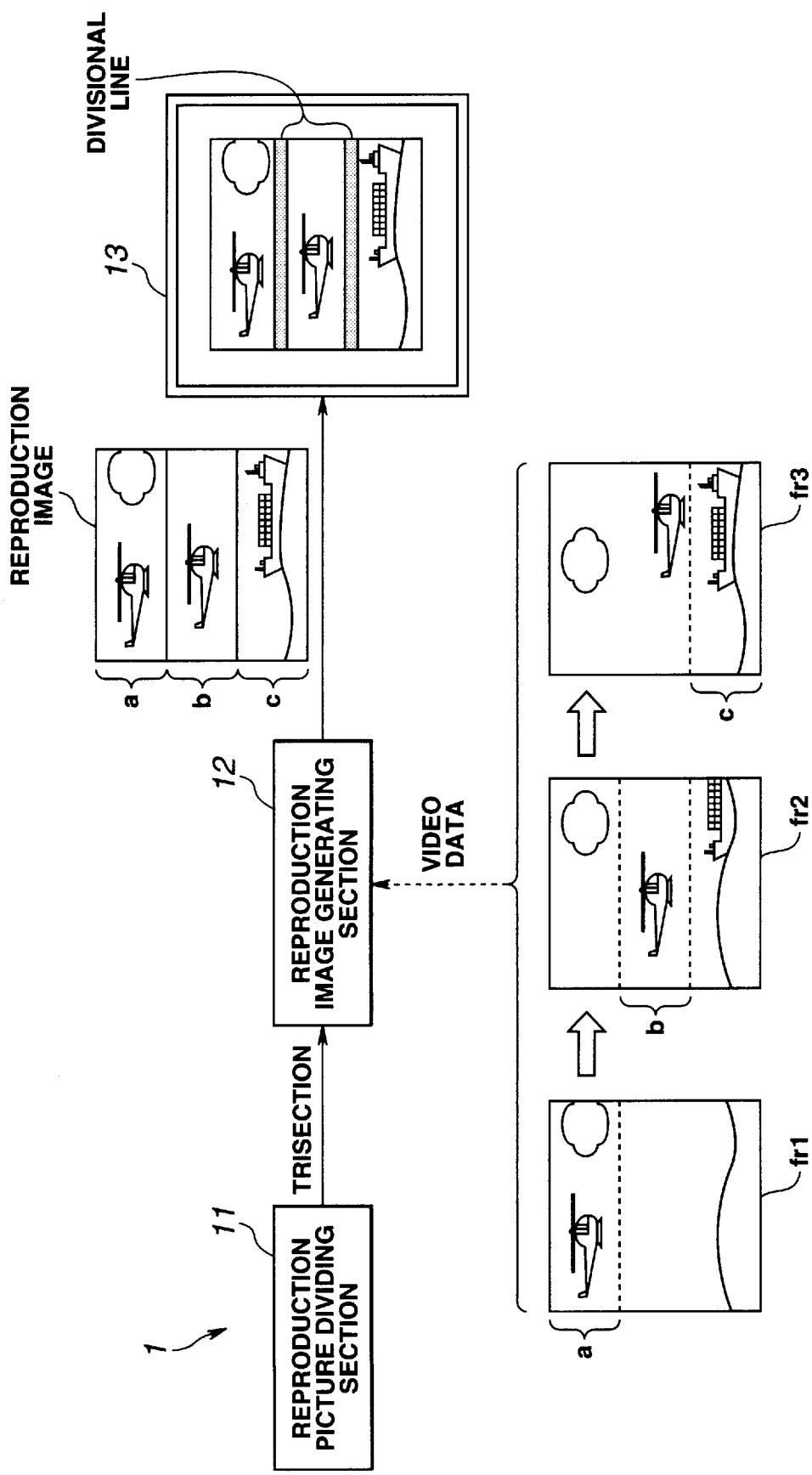
FIG. 2 is a view showing the principle of a video data reproducing apparatus according to this invention.

FIG. 2 is a view schematically showing image outputted from a video data reproducing apparatus 1 according to this invention and the configuration of the video data reproducing apparatus 1. The video data reproducing apparatus 1 carries out reproduction processing of video data so as to permit user to recognize image content in reproducing video data at speed different from that at the time of recording.

A reproduction picture dividing section 11 serves to divide reproduction picture on screen into plural areas in accordance with reproduction speed in the case where video data is reproduced at speed higher than one time speed.

In this example, in reproducing video data at n times speed, the reproduction picture dividing section 11 is operative so that in the case where n is integer, it divides reproduction picture into 1/n, while in the case where n is not integer, it divides reproduction picture into 1/(m+1) (m is integral part of n: n=m. . . . ) In FIG. 2, example of three times speed is indicated, wherein picture on screen is divided into three portions.

In this example, in the case where reproduction is carried out at high speed (e.g., 10 times speed or more), the number of divisions is fixed to 10. In this case, all displays of original images are not carried out, and frame image 10 times speed greater than the prior art is displayed.

A reproduction image generating section 12 serves to allocate frame images of video data to divided areas to generate reproduction image.

In this example, pictures of frame images located at the same positions as those areas are allocated with respect to the divided areas to generate reproduction image.

For example, in FIG. 2, picture area a of frame fr1, picture area b of frame fr2 and picture area c of frame fr3 are allocated to generate one reproduction image.

A reproduction image display section 13 displays reproduction image thus generated. In FIG. 2, in order to recognize that one image is generated by divided areas, divisional lines are inserted between areas thus to display reproduction image. It is to be noted that divisional line or lines may be displayed or may not be displayed. The generation control for divisional line will be described later.

Figure 3:
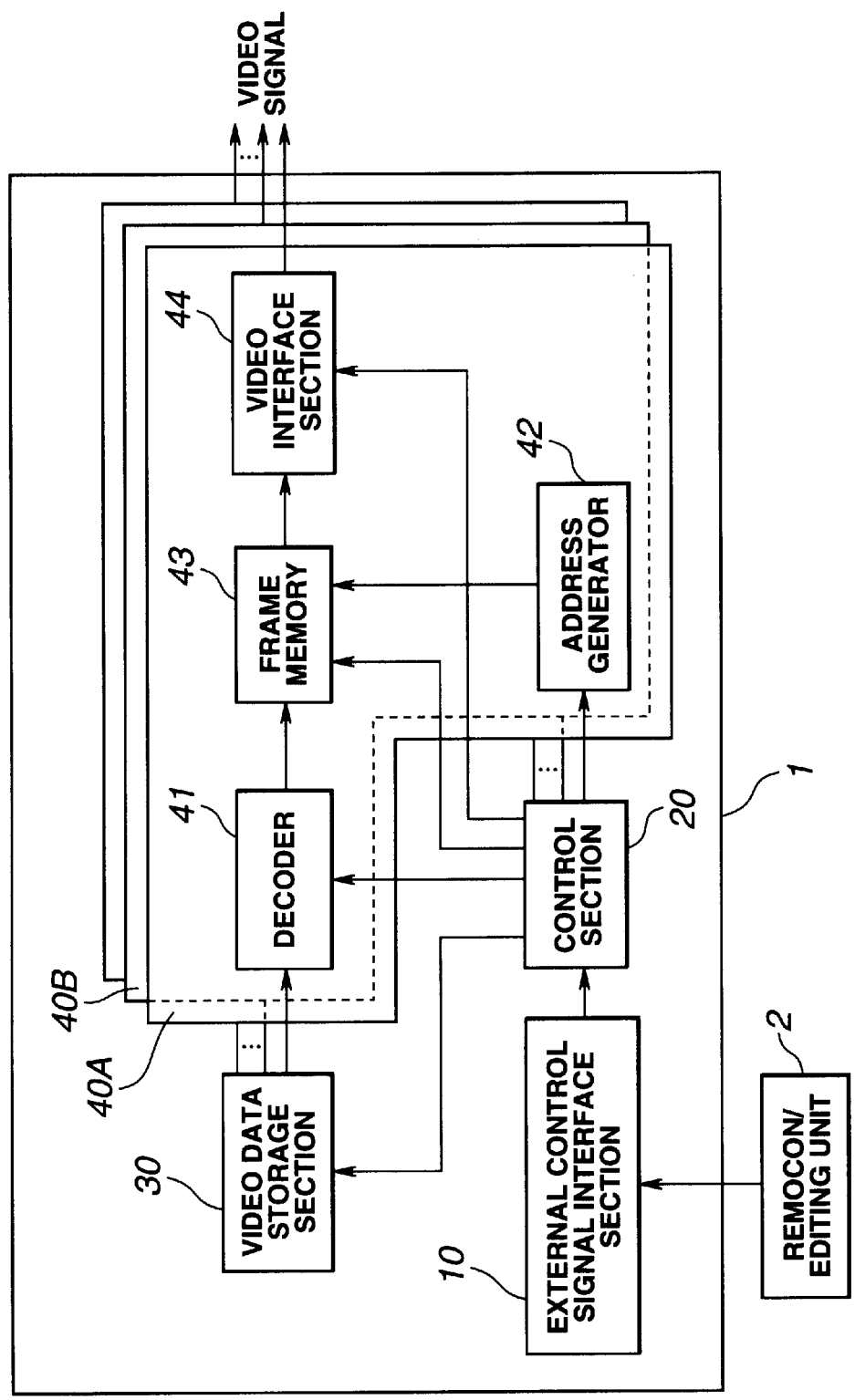
FIG. 3 is a block diagram showing more practical configuration of the video data reproducing apparatus.

Explanation will now be given with reference to FIG. 3 in connection with more practical configuration of the video data reproducing apparatus 1. As shown in FIG. 3, the image data reproducing apparatus 1 is composed of an external control interface section 10, a video data storage section 30, a control section 20 and plural output processing sections 40A, 40B . . . .

The respective output processing sections 40A, 40B . . . are adapted to become operative within allocated time slots from time slot generating means (not shown). In this case, while they are independently operative from rigorous point of view, since time slots allocated to the respective output processing sections 40A, 40B . . . are very short time, those output processing sections look as if they output plural video data at the same time.

The plural output processing sections 40A, 40B . . . are all of the same configuration. In FIG. 3, only the configuration of the output processing section 40A among the plural output processing sections 40A, 40B . . . is shown.

The output processing section 40A is composed of a decoder 41, a frame memory 43, a video interface section 44, and an address generator 42, etc.

The external control signal interface section 10 carries out interface processing of external control signals transmitted from an external unit such as remote control/editing unit 2 to send content of external control signal (multiple speed designation, etc.) to the control section 20.

The control section 20 carries out control of respective functions of the reproduction picture dividing section 11, the reproduction image generating section 12 and the reproduction image display section 13 which have been already explained by using peripheral blocks such as frame memory 43 and address generator 42, etc. which will be described later.

The video data storage section 30 is comprised of non-linear accessible recording medium, e.g., RAID (Redundant Arrays of Inexpensive Disks) in which plural hard disks are disposed in parallel, optical disk such as MO (Magneto Optical) disk or DVD, etc., or semiconductor memory such as flush memory or DRAM (Dynamic Random Access Memory), etc., and is adapted to store non-compressed or compressed video data.

As the compression system, there are employed MOTION-JPEG and MPEG utilizing interframe correlation, etc. In this example, video data is read out by read instruction from the control section 20.

The decoder 41 decodes compressed video data into base-band signals.

The frame memory 43 is caused to be of double buffer structure and is capable, while writing output data from the decoder 41 by one buffer, of outputting data written into another buffer to video interface section 44.

As size of the frame memory 43, in order to permit decoded video data to undergo buffering, image one frame is required at the minimum in the case of MOTION-JPEG and image 15 frames are required at the minimum in the MPEG in which 1 GOP consists of 15 frames.

The address generator 42 generates address for access of the frame memory 43 by control of the control section 20.

The video interface section 44 adds synchronizing (sync.) signal to base-band video data within the frame memory 43 to generate video signal to output it.

Figure 4:
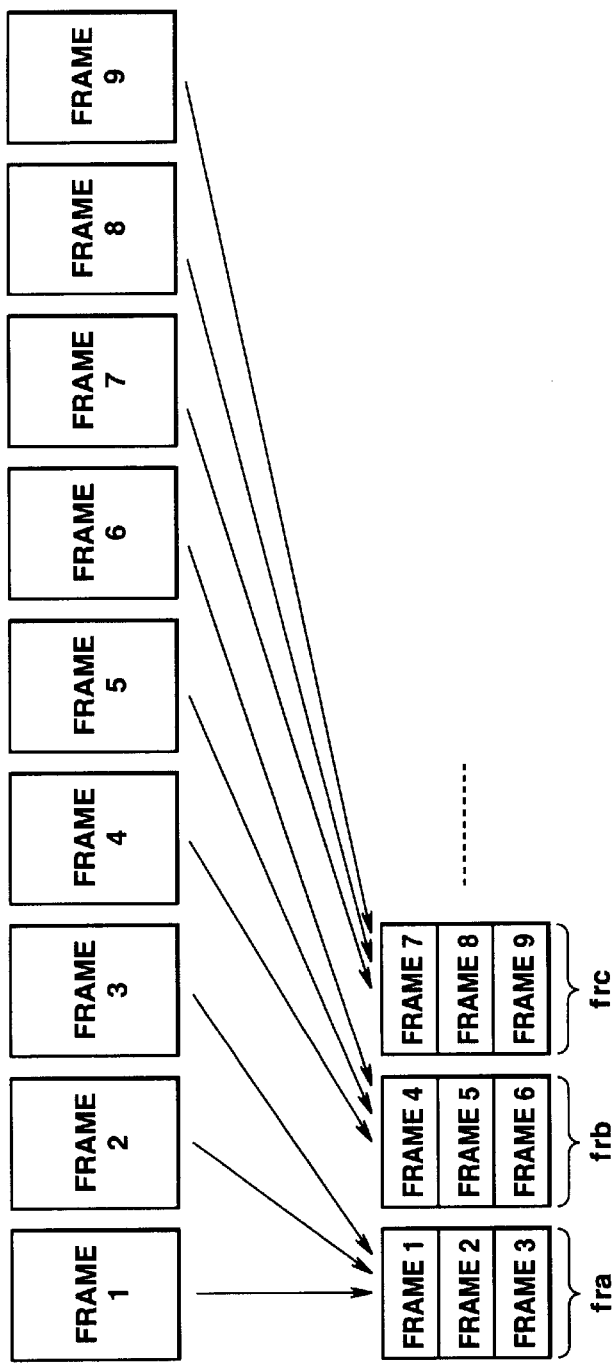
FIGS. 4A and 4B are views showing configuration of one frame when three times speed reproduction is carried out by the video data reproducing apparatus according to this invention.

Now, n times speed reproduction processing and reproduction image of this invention will be described. FIGS. 4A and 4B show the configuration of one frame when reproduction is carried out at three times speed of this invention.

In the case of one time speed, as shown in FIG. 4A, video data are displayed in order as frame 1, frame 2 . . . frame 9. In the case of three times speed, as shown in FIG. 4B, areas when frames 1, 2, 3 are respectively trisected are displayed at frame fra within one frame.

At frame frb, areas when frames 4, 5, 6 are respectively trisected are displayed. At frame frc, areas when frames 7, 8, 9 are respectively trisected are displayed. At times subsequent thereto, displays are similarly carried out. Namely, such an approach is employed to trisect one frame to allocate respective portions of successive three frames to respective divided areas to constitute one frame to output it.

Figure 5:
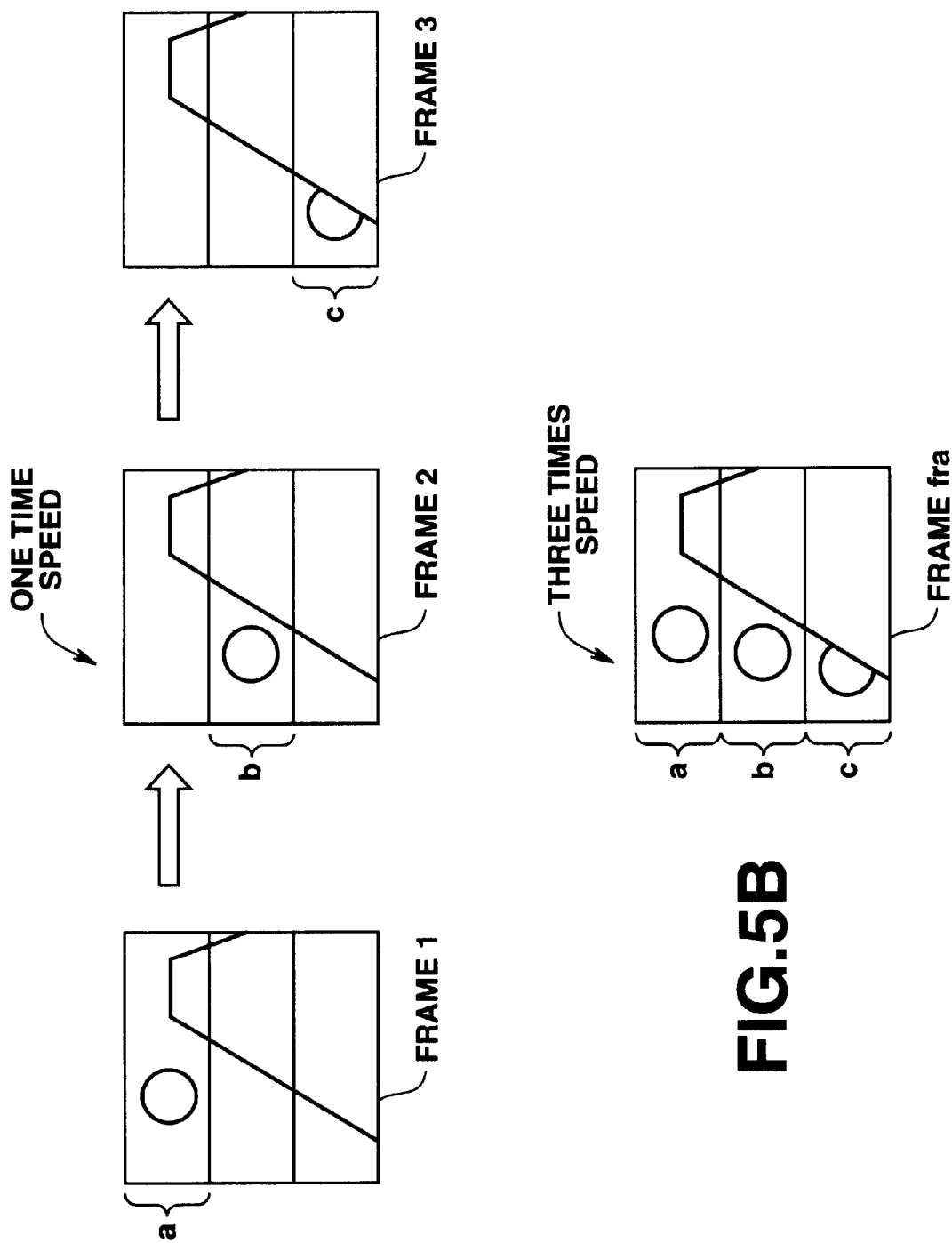
FIGS. 5A and 5B are views showing one example of reproduction image by the video data reproducing apparatus.

FIGS. 5A and 5B are views showing an example of reproduction image. Respective images of frames 1 to 3 are assumed to be original images at the time of one time speed (FIG. 5A). As reproduction image in the case where such frame is caused to undergo three times speed processing, areas a, b, c when respective frames 1 to 3 are trisected are displayed as single frame fra (FIG. 5B). Namely, such an approach is employed to divide one frame fra into three areas a, b, c to allocate respective areas a, b, c of successive three frames to the respective areas a, b, c to display allocated frame fra.

Figure 6:
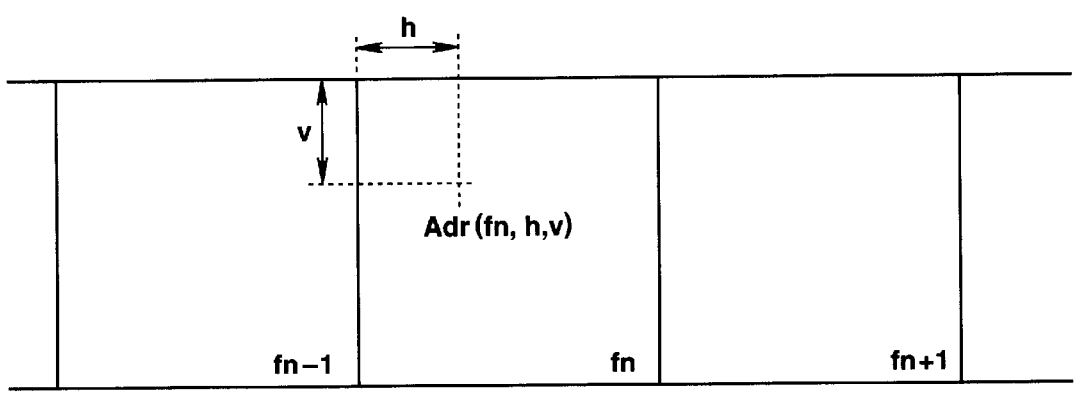
FIG. 6 is a view showing address of data of frame memory in the video data reproducing apparatus.

Explanation will now be given in detail in connection with the above-described processing for dividing one frame into plural areas to allocate successive frames to the respective areas. This is realized by allowing frame memory 43 of FIG. 3 to store image frame to control read-out operation from the frame memory 43. FIG. 6 is a view showing address of data of the frame memory 43. Data of the frame memory 43 is determined by frame No. fn, and horizontal address h and vertical address v within one frame. For example, address of Adr of FIG. 6 is (fn, h, v).

The operation of the address generator 42 will now be explained with reference to FIG. 7.

Figure 7:
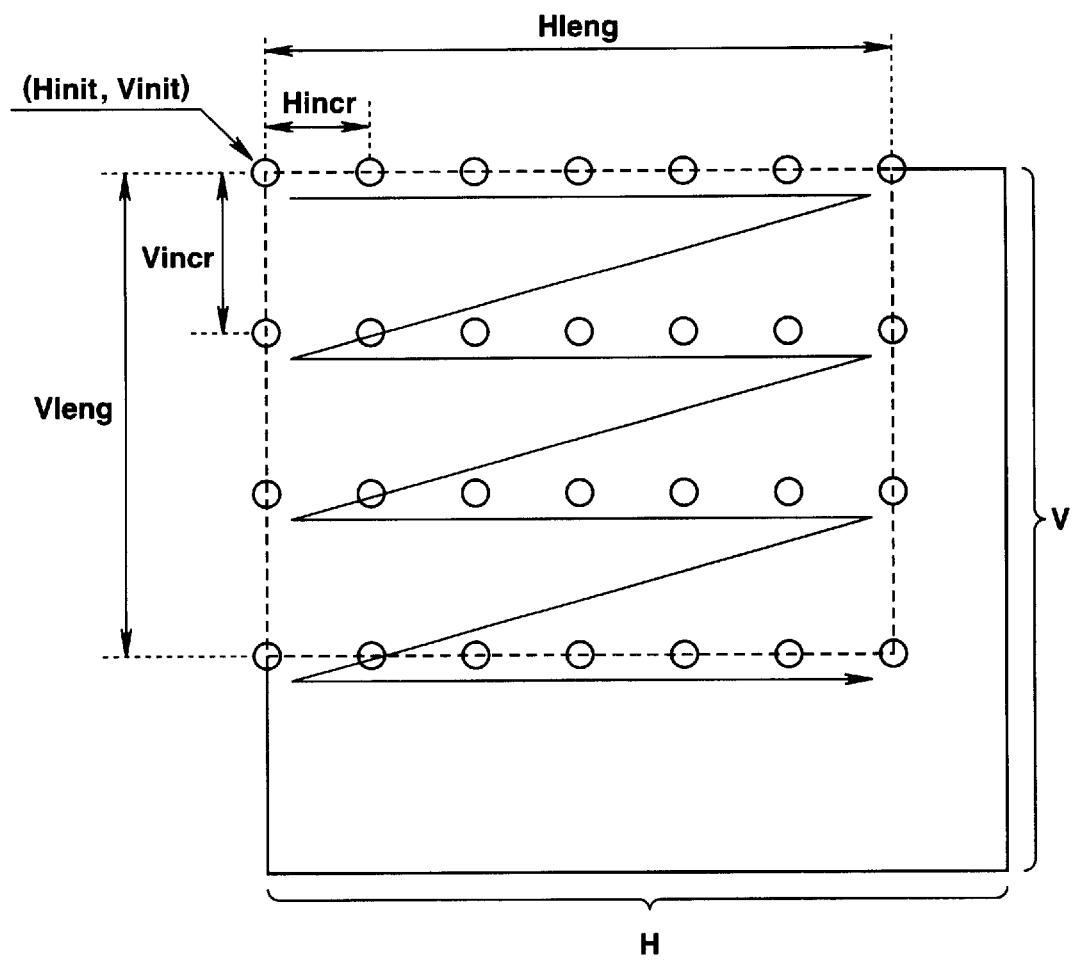
FIG. 7 is a view showing parameter and operation of address generator in the video data reproducing apparatus.

FIG. 7 represents image one frame as a whole. The address generator 42 generates addresses on scanning lines of this frame to carry out addressing by a predetermined rule (in the direction indicated by arrow of FIG. 7) within one frame in accordance with parameters.

The parameters that the address generator 42 sets are frame number fn, initial values of address (Hinit, Vinit), incremental quantities in horizontal H direction and in the vertical V direction (Hincr, Vincr) and range of addressing (Hieng, Vleng).

Accordingly, the address generator 42 provides parameters of (fn, Hinit, Hincr, Hleng, Vinit, Vincr, Vleng) to thereby carry out designation of video data.

The control flow of three times speed reproduction processing in this invention will now be explained with reference to FIGS. 8 and 9.

Figure 8:
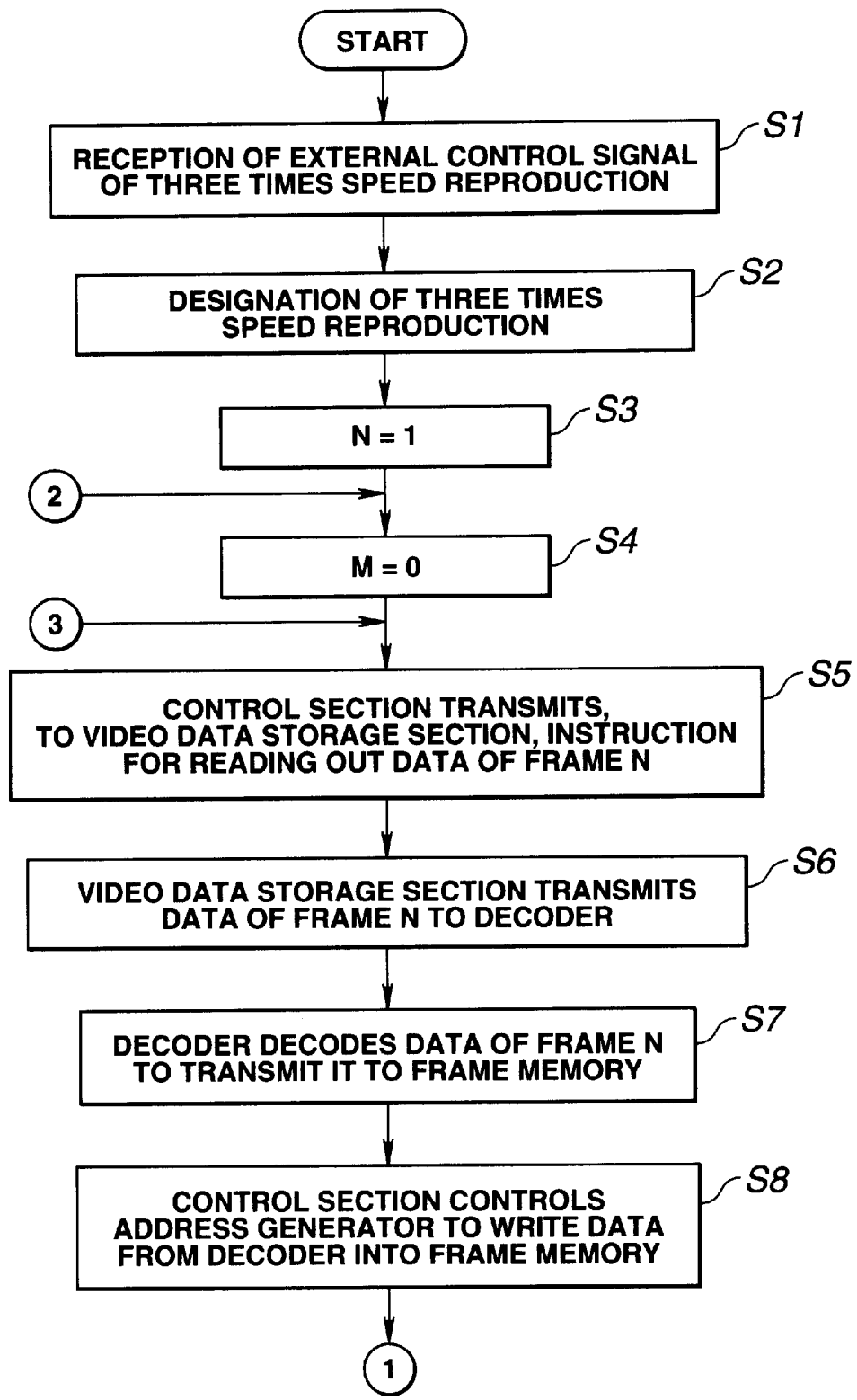
FIG. 8 is a view showing the first half of control flow of three times speed reproduction processing in the video data reproducing apparatus.
Figure 9:
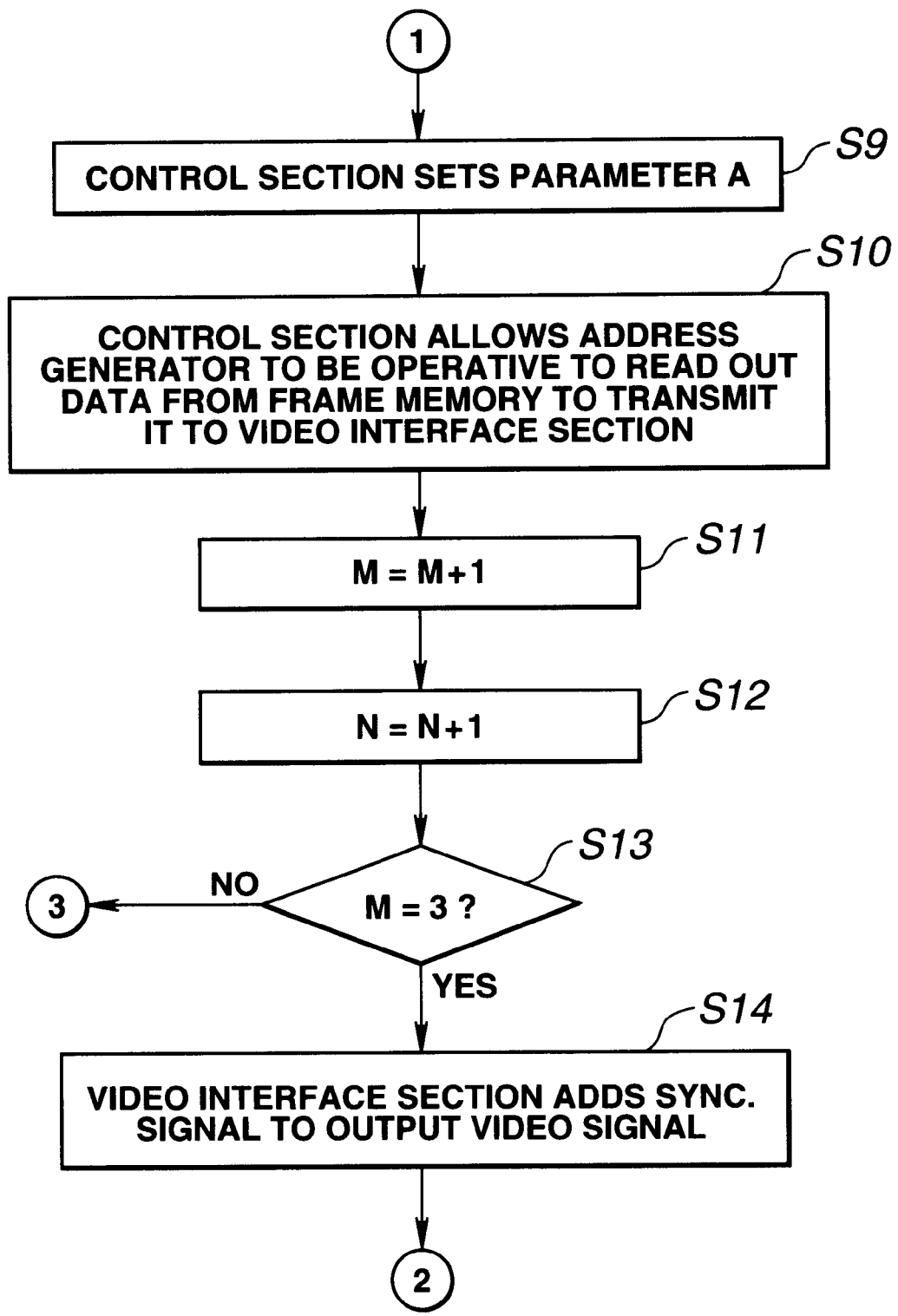
FIG. 9 is a view showing the latter half of control flow of the three times speed reproduction processing.

FIGS. 8 and 9 show control flow of three times reproduction processing in the case where video data of Intra-frame or non-compressed video data completed in frame units are stored in data storage section 30.

In this three times speed reproduction processing, initially, at step S1, external control signal interface section 10 receives, from remocon/editing unit 2, external control signal indicative of three times speed reproduction.

Subsequently, the processing shifts to step S2. Thus, the external control signal interface section 10 converts the external control signal received at the step S1 into a signal in a form such that it can be processed within the video data reproducing unit 1, or a signal in a form such that it can be processed within the control section 20 to deliver, to the control section 20, control command designated by the converted three times speed reproduction signal.

The control section 20 sets N=1 (step S3) and sets M=0 (step S4). N, M will be described later.

Then, the processing shifts to step S5. Thus, the control section 20 transmits control command to read out data of frame N with respect to video data storage section 30.

The video data storage section 30 which has received this control command reads out stored video data of frame N to output it to decoder 41 (step S6).

The decoder 41 decodes inputted data of frame N in the case where it is compressed to output it to the frame memory 43.

Subsequently, the processing shifts to step S8. Thus, the control section 20 controls address generator 42 to write, into the frame memory 43, video data of frame N outputted from the decoder 41.

Then, the processing shifts to step S9. Thus, the control section 20 carries out setting of parameter A. The parameter A is parameter that the above-described address generator 42 sets, and consists of frame number (fn), initial values of address (Hinit, Vinit), incremental quantities (Hincr, Vincr) in horizontal H and vertical V directions and the range of addressing (Hleng, Vleng). In this example, e.g., A=(fn=N, Hinit=0, Hincr=1, Hleng=H, Vinit=M·V/3, Vincr=1, Vleng=V/3) is set. Namely, frame number indicates 1 set at the step S3, initial values of address indicates (0, 0), incremental quantities in horizontal H and vertical H directions indicate (1, 1), and the range of addressing indicates (H, V/3).

Further, the address generator 42 sets this parameter A to control read-out operation of the frame memory 43 on the basis of this parameter A.

Subsequently, the processing shifts to step S10. Thus, in order to carry out read-out operation of data from the frame memory 43 on the basis of this parameter, the control section 20 controls the address generator 42 so as to read out data from the frame memory 43.

The data which has been read out from the frame memory 43 is outputted to video interface section 44.

Then, the control section 20 increments M (step S11), and further increments N (step S12).

At the subsequent step S13, the control section 20 judges whether or not value of M incremented at the step S11 is 3. In this case, when value of M is not 3, the processing returns to the step S5. Thus, the above-described processing are repeated. On the other hand, when value of M is 3, the processing shifts to step S14.

At the step S14, the video interface section 44 adds synchronizing (sync.) signal to data which has been read out from the frame memory 43 to output it to the external as video signal. Further, the processing returns to the step S4. Thus, the above-described processing are repeated.

Figure 10:
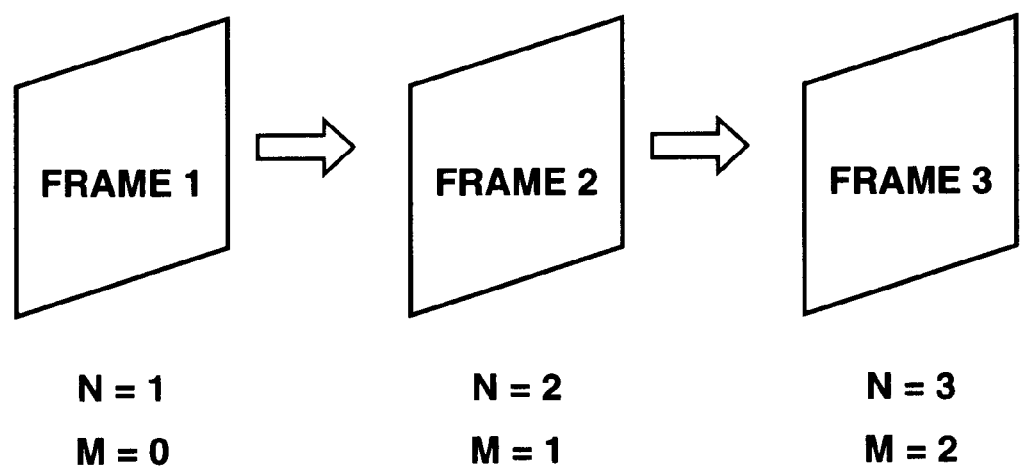
FIG. 10 is a view showing the relationship between parameter N and parameter M in the multiple speed reproduction processing.

FIG. 10 is a view showing the relationship between parameter N and parameter M in the above-described three times speed reproduction processing. M, N are parameters corresponding to three image frames necessary for obtaining three times speed reproduction picture shown in FIG. 4B or FIG. 5B. Namely, the first frame 1 indicates N=1, M=0; the second frame 2 indicates N=2, M=1; and the third frame 3 indicates N=3, M=2.

In the case where video data are stored in the non-compression state, or by MOTION-JPEG or Intra-MPEG as stated above, such video data are stored in frame units. Accordingly, it is possible to read out data of one frame from the video data storage section 30.

Further, when such video data is decoded by the decoder 41, image of base band signal is written into the area corresponding to one frame of the frame memory 43.

In addition, the control section 20 controls the address generator 42 to read out images of areas of one third as set in the parameter A from one frame. Accordingly, areas of one third which are read out from the frame memory 43 are upper ⅓, medium ⅓ and lower ⅓ in order.

The three times speed reproduction processing shown in FIGS. 8 and 9 is the processing where video data of intra-frame or non-compressed video data completed in frame units are stored in the data storage section 30. Explanation will now be given with reference to FIGS. 11 and 12 in connection with the case where video data in which frames correlate therebetween such as Inter-MPEG (1 GOP=15 frames) is stored in the video data storage section 30.

Figure 11:
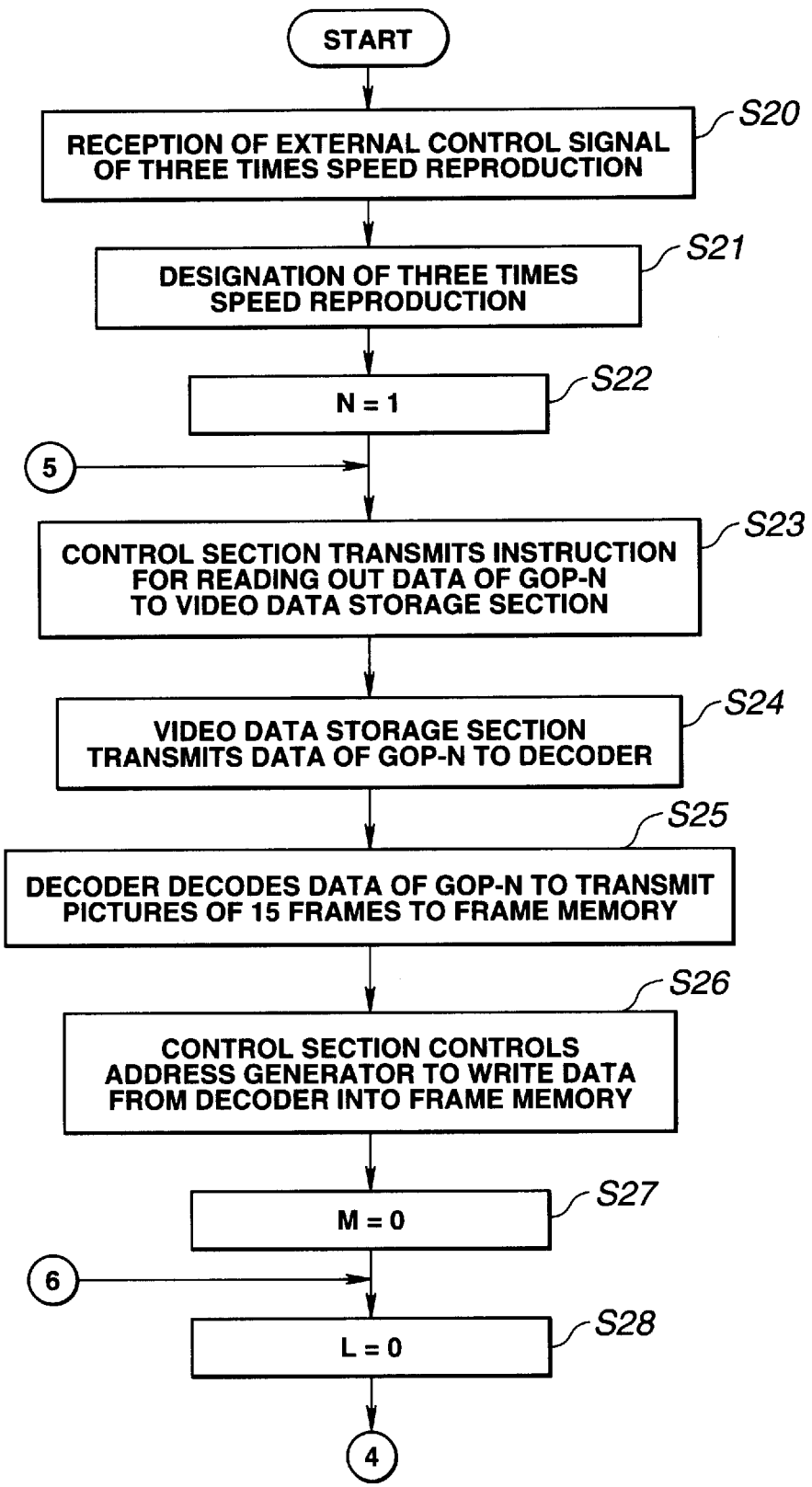
FIG. 11 is a view showing the first half of control flow of three times speed reproduction processing in the case where video data of 1 GOP is stored in video data storage section.
Figure 12:
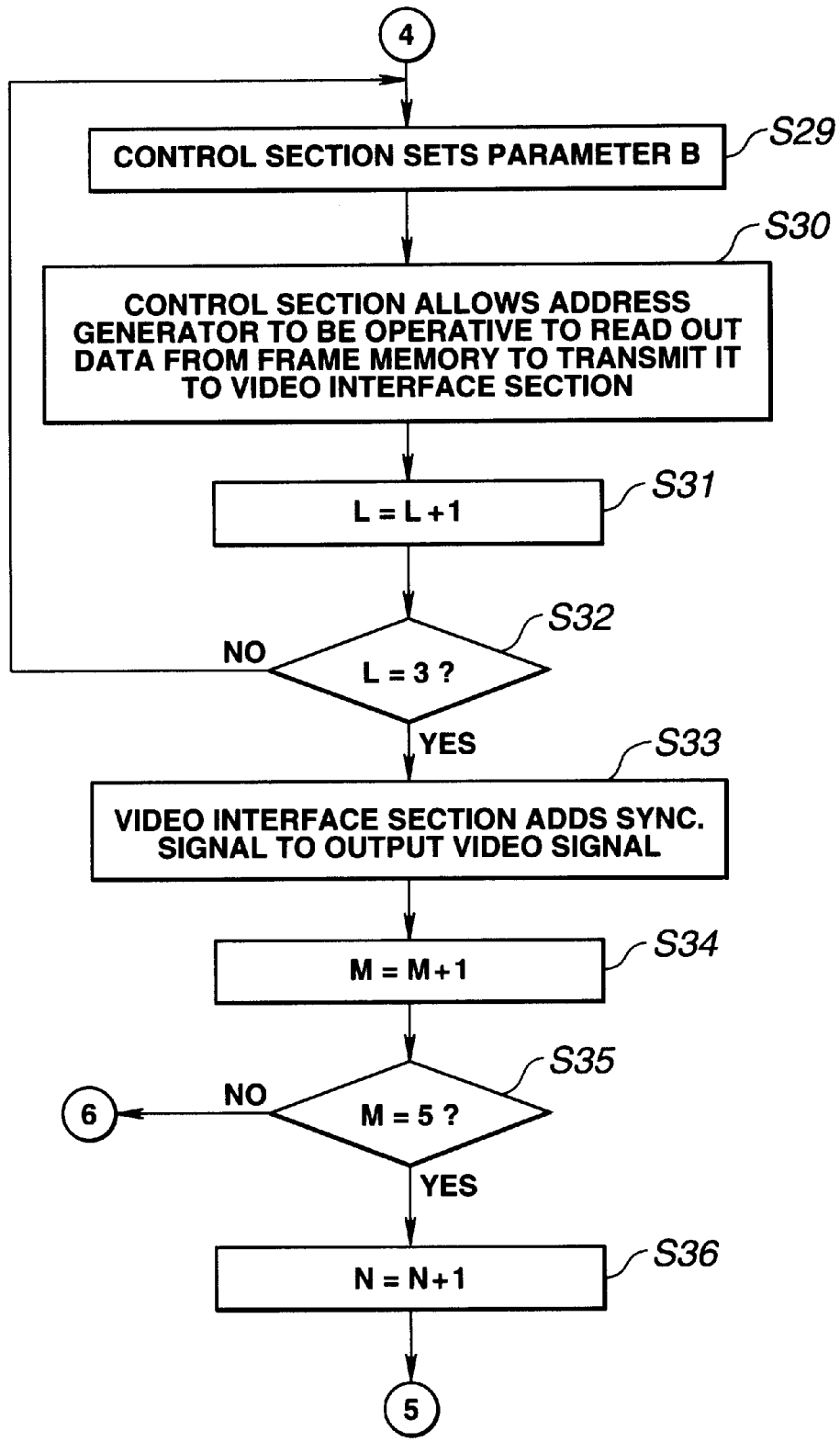
FIG. 12 is a view showing the latter half of control flow of the three times speed reproduction processing.

FIGS. 11 and 12 show control flow of three times speed reproduction processing in the case where video data of 1 GOP=15 frames are stored in the video data storage section 30.

In this three times speed reproduction processing, initially, external control signal interface section 10 receives external control signal designating three times speed reproduction (step S20).

The external control signal interface section 10 which has received the external control signal converts the external control signal into a signal in a form such that it can be processed within video data reproducing unit 1 or within the control section 20 to transmit control command designating three times speed reproduction to the control section 20 (step S21).

Then, the control section 20 sets parameter N to 1 (step S22). This parameter N indicates number of 1 GOP unit.

Subsequently, the control section 20 transmits, to the video data storage section 30, control command so as to read out video data of GOP number set at the step S22 (video data corresponding to 1 GOP) (step S23).

The video data storage section 30 which has received the above-mentioned control command reads out video data of the N-th GOP to output it to the decoder 41 (step S24).

The decoder 41 decodes compressed video data corresponding to 1 GOP outputted from the video data storage section 30 to output non-compressed video data of 15 frames to the frame memory 43 (step S25).

Then, the control section 20 controls the address generator 42 to write, into the frame memory 43, the non-compressed video data of 15 frames outputted from the decoder 41 (step S26).

Subsequently, the control section 20 sets M=0 (step S27) and further sets L=0 (step S28). N, M and L will be described later.

Further, the control section 20 sets parameter B. This parameter B is parameter that the above-described address generator 42 sets, and consists of frame number (fn), initial values of address (Hinit, Vinit), incremental quantities in horizontal H and vertical V directions (Hincr, Vincr), and range of addressing (Hleng, Vleng). In this example, e.g., B=(fn=3M+L+1, Hinit=0, Hincr=1, Hleng=H, Vinit=L·V/3, Vincr=1, Vleng=V/3) is set. Namely, initial values of address (0, 0), incremental quantities in horizontal H and vertical V directions (1,1) and the range of addressing (H, V/3) are set with respect to video data of GOP No. 1 set at the step S22.

The control section 20 controls the address generator 42 on the basis of this parameter B to read out non-compressed video data of 1 GOP (15 frames) from the frame memory 43. The video data which has been read out from the frame memory 43 is outputted to the video interface section 44.

Then, the control section 20 increments value of L (step S31).

Further, the control section 20 judges whether or not value of L incremented at the step S31 is 3 (step S32). In this case, when value of L is not 3, the processing returns to the step S29. Thus, the above-described processing will be repeated.

On the other hand, when value of L is 3 at the step S32, the video interface section 44 adds synchronizing (sync.) signal to data which has been read out from the frame memory 43 to output it to the external as video signal (step S33).

Then, the control section 20 increments value of M (step S34).

Then, the control section 20 judges whether or not value of M incremented at the step S34 is 5 (step S35). Namely, at this step S35, whether or not the above-described processing have been completed with respect to all of image frames of 1 GOP is judged. In this case, when value of M is not 5, the processing returns to the step S28. Thus above-described processing will be repeated.

On the other hand, when value of M is 5 at the step S35, the control section 20 increments value of N to designate the next GOP (step S36). The processing returns to the step S23. Thus, the above-described processing will be repeated.

In this way, the control section 20 controls the address generator 42 on the basis of the set parameter B to read out images of upper ⅓, medium ⅓ and lower ⅓ in succession from the frame memory 43.

Figure 13:
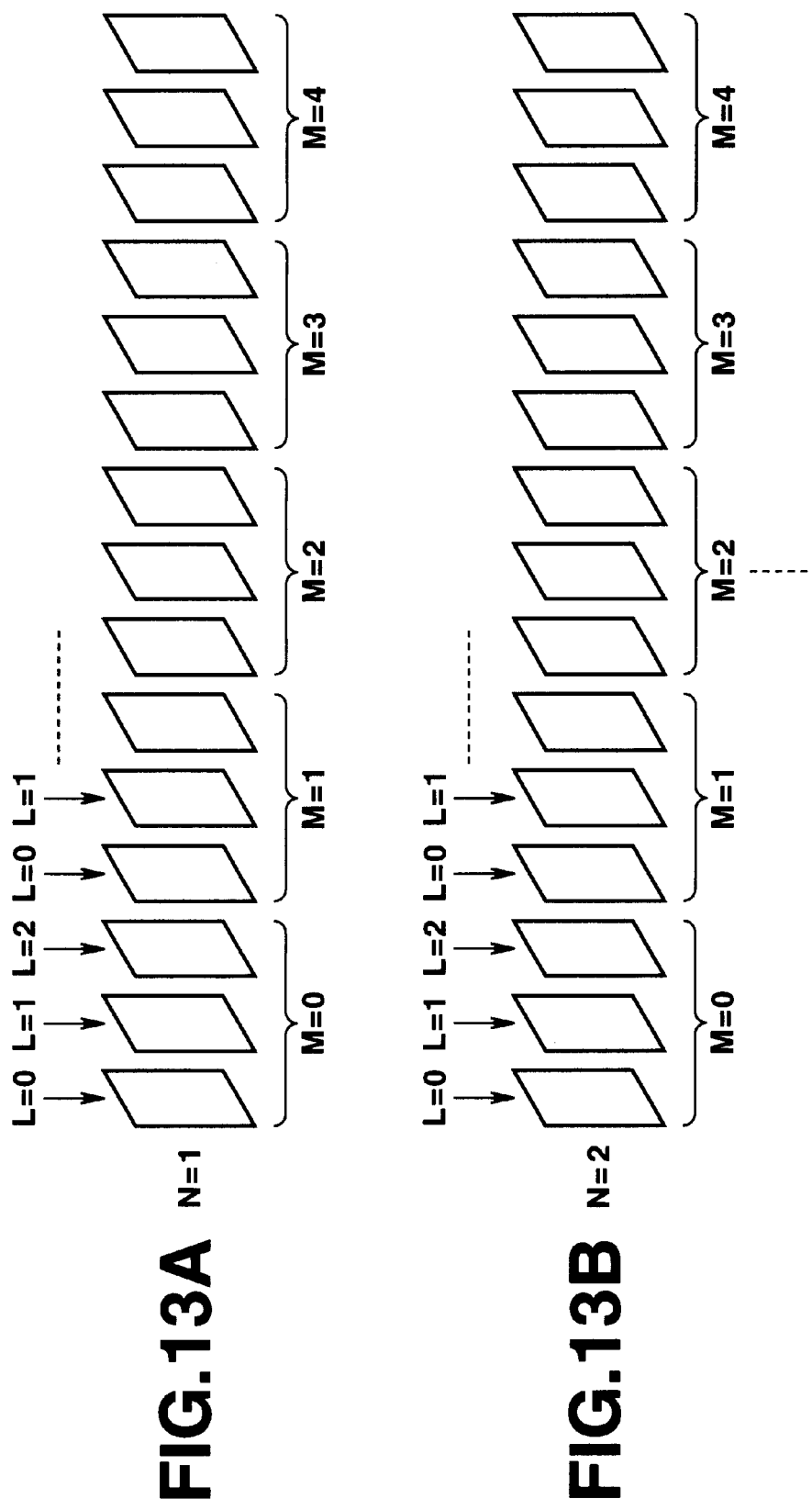
FIG. 13 is a view showing the relationship of parameters N, M and L.

The relationship of parameters N, M and L will now be described with reference to FIG. 13.

As described above, in the image frame, 1 GOP consists of 15 frames in total. At the time of three times speed reproduction, output image 1 frame is constituted by three frames. The parameter M indicates numbers allocated in order with these 3 frames being as one group. Accordingly, in 1 GOP, numbers from M=0 to M=4 exist in order. Numbers allocated to three image frames of respective groups are parameter L. Every respective groups, numbers from L=0 to L=2 exist. In addition, parameter N is numbers of respective GOPs. Since image frames corresponding to two GOPs exist in the example shown in FIG. 13, N=1, N=2 indicating image frames in order are allocated.

Figure 14:
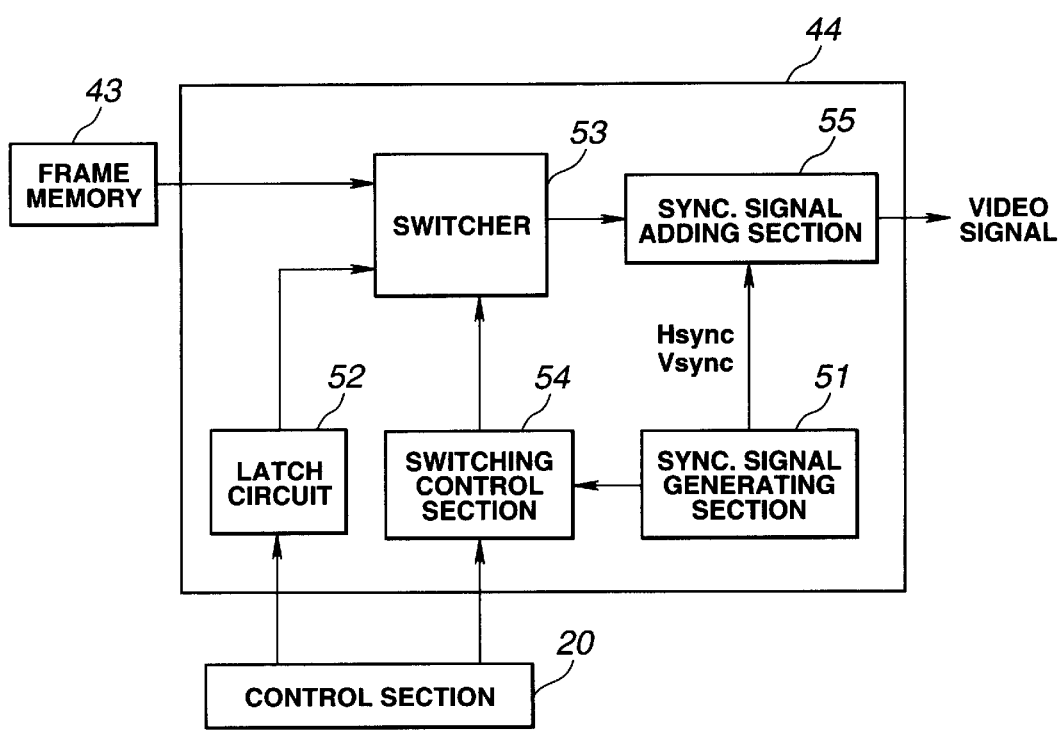
FIG. 14 is a view showing the configuration of video interface section in the video data reproducing apparatus.

The video interface section 44 will now be described. FIG. 14 is a view showing the configuration of the video interface section 44.

The video interface section 44 is composed of a synchronizing (sync.) signal generating section 51, a latch circuit 52, a switcher 53, a switching control section 54 and a synchronizing (sync.) signal adding section 55, etc.

The synchronizing signal generating section 51 generates a horizontal synchronizing signal (Hsync) and a vertical synchronizing signal (Vsync) on the basis of synchronizing signal within broadcasting station (house sync) or synchronizing signal from quartz oscillator, etc. The horizontal synchronizing signal (Hsync) and the vertical synchronizing signal (Vsync) generated by this synchronizing signal generating section 51 are delivered to the synchronizing signal adding section 55, and the horizontal synchronizing signal (Hsync) is delivered to the switching control section 54.

The latch circuit 52 sets the above-described divisional line on the basis of control command from the control section 20. In this instance, color data of divisional line may be set.

The switcher 53 carries out switching between video data which is output from the frame memory 43 and divisional line which is output from the latch circuit 52. This switching is carried out by control of the switching control section 54 on the basis of designation from the control section 20.

The switching control section 54 carries out a control for setting the number of divisions and width of divisional line which are designated from the control section 20 to count horizontal synchronizing signal (Hsync) to switch the switcher 53 to the frame memory 43 side or the latch circuit 52 side.

The synchronizing signal adding section 55 adds horizontal synchronizing signal (Hsync) and vertical synchronizing signal (Vsync) delivered from the synchronizing signal generating section 51 to video data delivered from the switcher 53 to output it.

Figure 15:
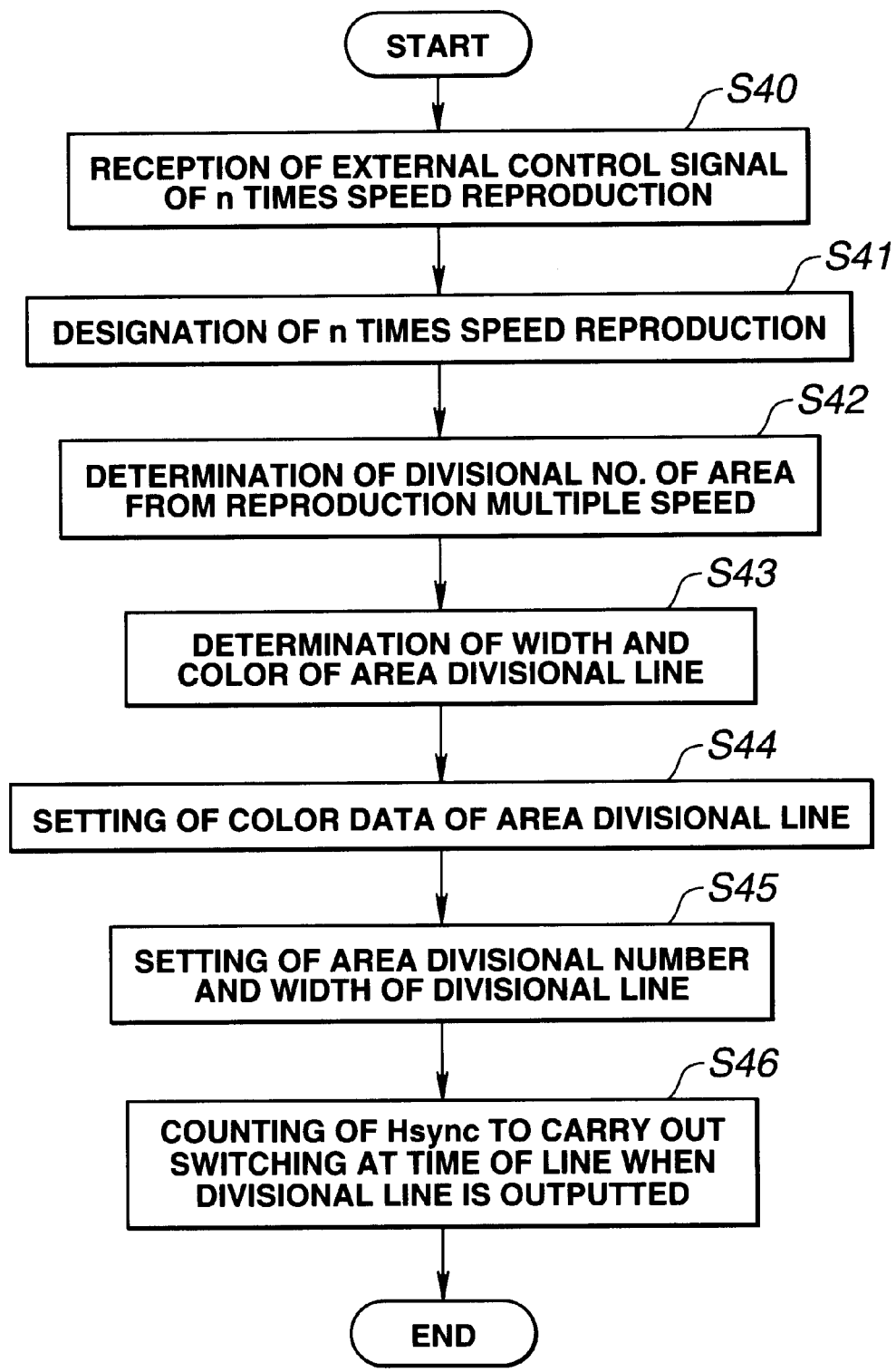
FIG. 15 is a view showing processing flow of generation control for divisional line in the video data reproducing apparatus.

Explanation will be given with reference to FIG. 15 in connection with processing of generation control for the above-described divisional line by designation of the control section 20.

In this generation control processing for divisional line, the control section 20 receives external control instruction designating n times speed reproduction inputted through the external control signal interface section 10 from the remocon/editing unit 2 (step S40).

Then, the control section 20 sends, to the video interface section 44, control command designating n times speed reproduction (step S41).

Subsequently, the control section 20 determines the number of divisions of the area of 1 frame from designated reproduction multiple speed (step S42) to further set width and color of the area divisional line (step S43).

Subsequently, the control section 20 sends control commands indicating the set number of area divisions, and set width and color of area divisional line to the latch circuit 52 of the video interface section 44 (step S44) to further send these control commands to the switching control section 54 of the video interface section 44 (step S45).

In addition, the switching control section 54 counts horizontal synchronizing signal (Hsync) delivered from the synchronizing signal generating section 51 on the basis of the control commands from the control section 20 to control the switcher 53 so that it is switched to the latch circuit 52 side when current scanning line is scanning line at which divisional line is outputted (step S46).

A second embodiment in which this invention is modified will now be described. In the second embodiment, the entirety of contracted frame image is allocated to divided areas to generate reproduction image.

Figure 16:
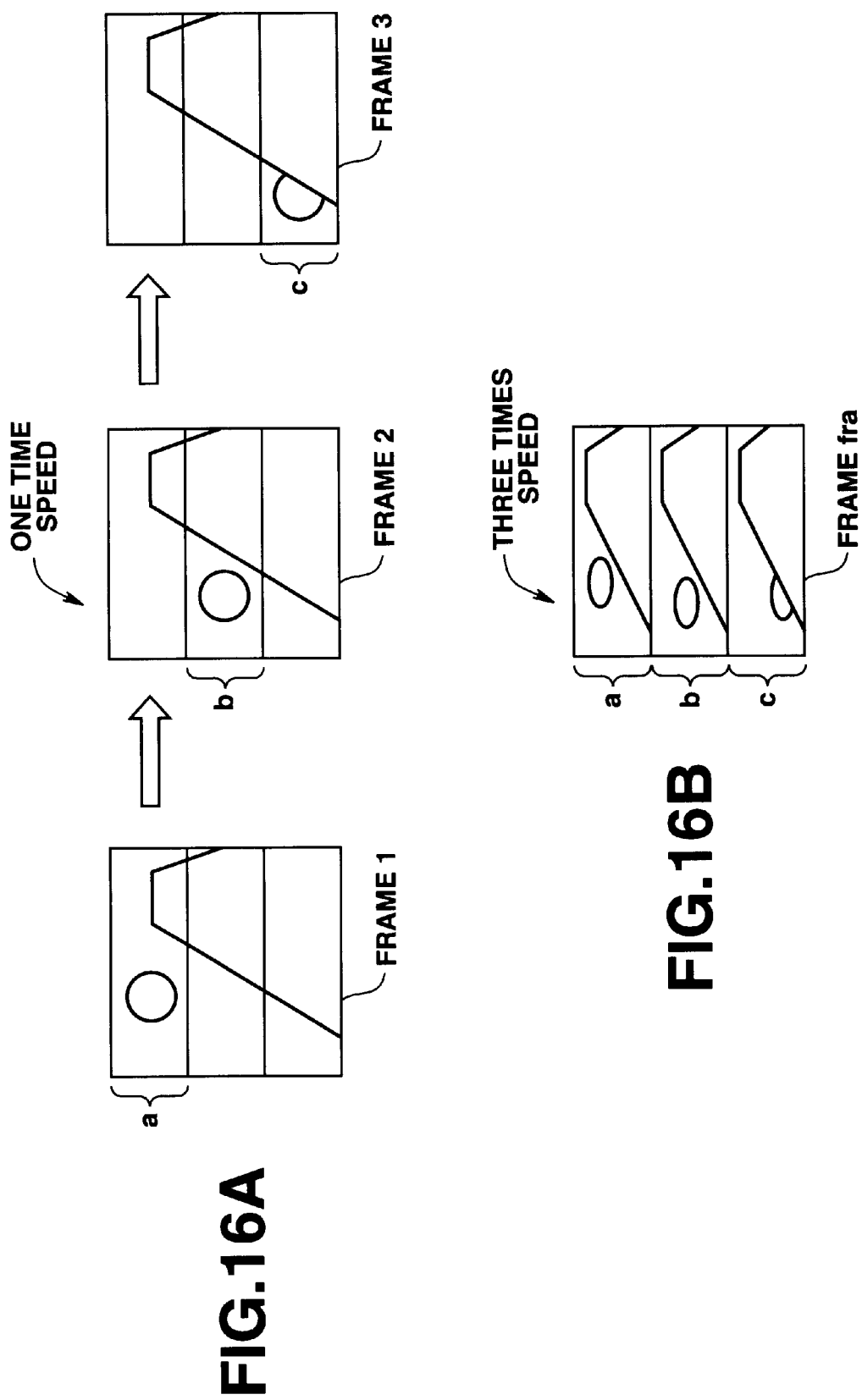
FIGS. 16A and 16B are views showing processing for allocating contracted frame image to divided areas in the video data reproducing apparatus to generate reproduction image.

FIGS. 16A and 16B are views showing reproduction image of the second embodiment. It is assumed that images of frames 1 to 3 are original image at the time of one time speed (FIG. 16A). As reproduction images in the case where these images are caused to undergo three times speed processing, the entireties of frames 1 to 3 are respectively contracted to display them as one frame fra (FIG. 16B).

Explanation will now be given with reference to FIGS. 17 and 18 in connection with processing to allocate contracted image to one frame divided by designation of the control section 20 to output reproduction video signal.

Figure 17:
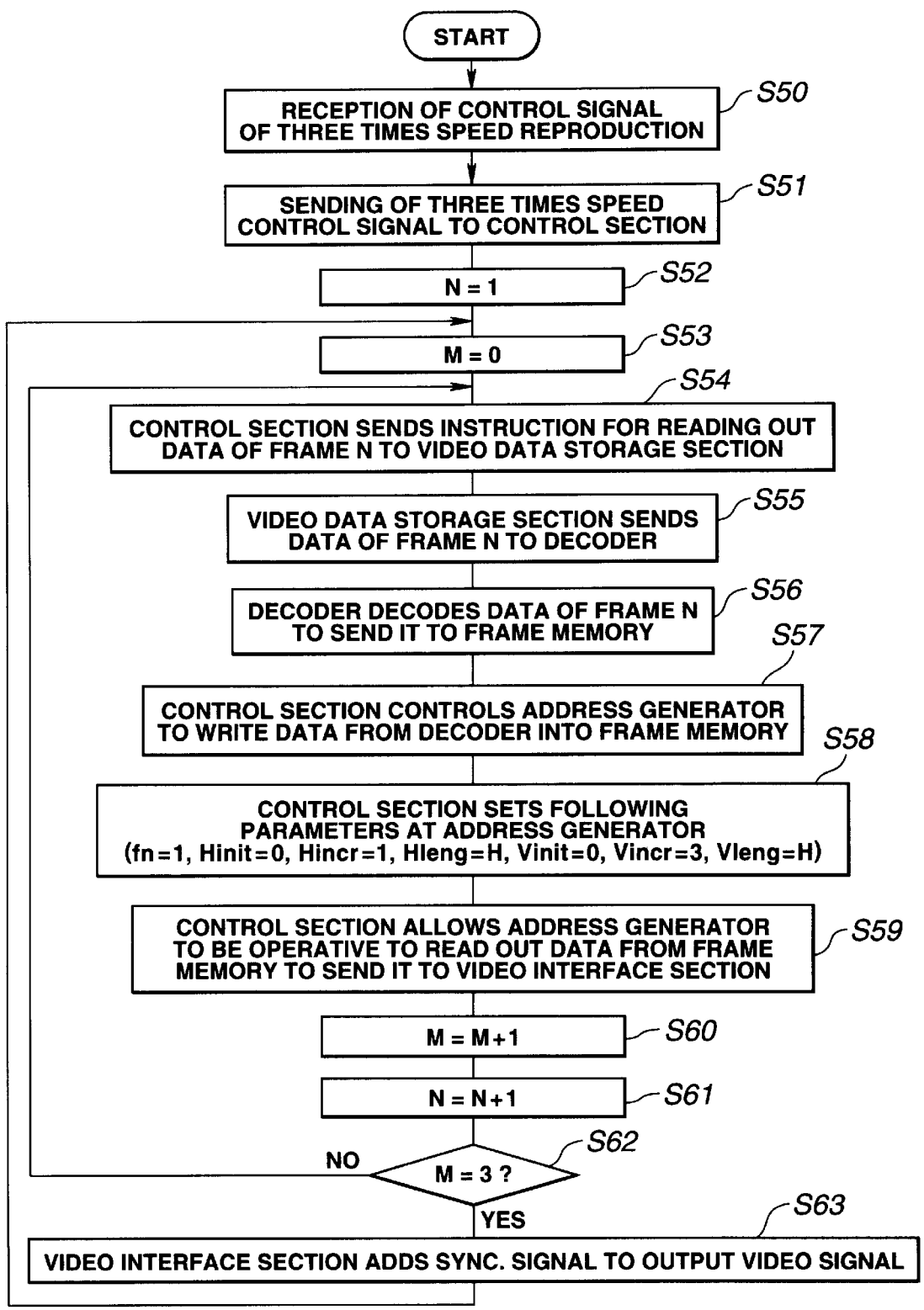
FIG. 17 is a view showing control flow of three times speed reproduction processing in the case where the above-mentioned contracted frame image is allocated to generate reproduction image.

FIG. 17 shows a control flow of three times speed reproduction processing in the case where non-compressed video data, or video data completed in frame units like MOTION-JPEG and Intra-MPEG are stored in the video data storage section 30.

In this three times speed reproduction processing, initially, the external control signal interface section 10 receives an external control signal to designate three times speed reproduction from external unit such as remocon/editing unit 2, etc. (step S50).

The external control signal interface section 10 which has received the external control signal converts the external control signal into a signal in such a form that it can be processed within the video data reproducing unit 1 or within the control section 20 to transmit control command designating three times speed reproduction to the control section 20 (step S51).

Then, the control section 20 sets N=1 (step S52) and further sets M=0 (step S53). N, M will be described later.

Subsequently, the control section 20 transmits, to the video data storage section 30, control command for reading out data of frame N (step S54).

The video data storage section 30 which has received this control command reads out video data of the N-th frame recorded on the recording medium to output it to the decoder 41 (step S55).

The decoder 41 expands inputted data of frame N in the case where such data is compressed to output it to the frame memory 43 (step S56).

Then, the control section 20 controls the address generator 42 to write, into the frame memory 43, video data of frame N outputted from the decoder 41 (step S57).

Then, the control section 20 sets parameter C as described below at the address generator 42 (step S58). In this example, since the control section 20 receives control command (instruction) designating three times speed reproduction, C=(fn=1, Hinit=0, Hincr=1, Hleng=H, Vinit=0, Vincr=3, Vleng=H) is set at the address generator 42. Namely, the control section 20 gives, to the address generator 42, designation (instruction) to carry out read-out operation from address (0, 0) up to address (H, H) by incremental quantity (1, 3) in horizontal and vertical directions with respect to the first video data stored in the frame memory 43.

The address generator 42 which has received this parameter C reads out video data stored at the frame memory 43 in accordance with this parameter C to output the data thus read out to the video interface section 44 (step S59).

Then, the control section 20 increments M (step S60) and further increments N (step S61).

Then, the control section 20 judges whether or not value of M incremented at the step S60 is 3 (step S62). In this example, N is parameter indicating frame number of video data which is read out from the video interface section 44. When N=1, corresponding frame indicates the first frame. Moreover, M is parameter indicating the number of divisions of one frame, and indicates multiple speed ratio of multiple speed reproduction instruction that the external control signal interface section 10 has received. When M=3, three times speed reproduction is designated and when M=4, four times speed reproduction is designated. The number of divisions (divisional number) of one frame is determined in accordance with value of this reproduction ratio.

Namely, at the step S62, since the processing shown in FIG. 17 is the processing to carry out output by three times speed reproduction, whether or not video data has been read out from the frame memory 43 by the number of divisions (M=3) of the frame is judged.

When value of M is not 3 at the step S62, the processing returns to the step S54. Thus, the above-described processing will be repeated.

On the other hand, when value of M is 3 at the step S62, video data which has been read out from the video data storage section 30 is allocated to respective areas of output image 1 frame after undergone contraction. Thus, the video interface section 44 adds synchronizing (sync.) signal to output video data outputted from the frame memory 43 to output it to the external as a video signal (step S63). Further, the processing returns to the step S53. Thus, the above-described processing is repeated.

Explanation will now be given with reference to FIG. 18 in connection with processing to allocate image of contracted frame to divided portions of one frame in the case where video data such that plural frames correlate with each other (In this case, 1 GOP=15 frames) like Inter-MPEG are stored in the video data storage section 30, thus to output reproduction image.

Figure 18:
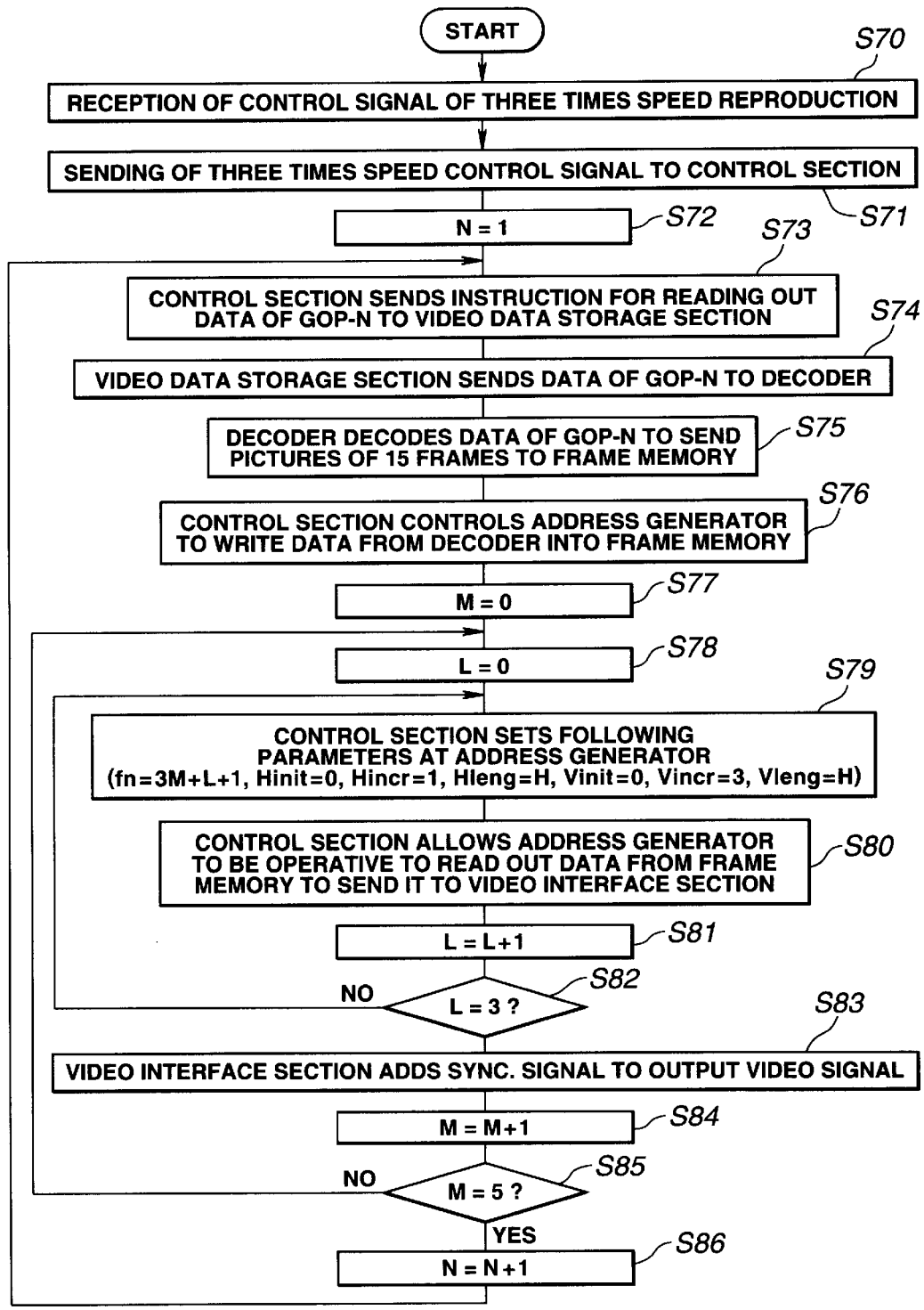
FIG. 18 is a view showing another control flow of three times speed reproduction processing in the case where the above-mentioned contracted frame image is allocated to generate reproduction image.

FIG. 18 shows a control flow of three times speed reproduction processing.

In this three times speed reproduction processing, initially, the external control signal interface section 10 receives an external control signal designating three times speed reproduction from external unit such as remocon/editing unit 2 (step S70).

The external control signal interface section 10 which has received the external control signal converts the external control signal into a signal in a form such that it can be processed within the video data reproducing apparatus 1 or within the control section 20 to transmit control command designating three times speed reproduction to the control section 20 (step S71).

Then, the control section 20 sets N=1 indicating GOP number (step S72).

Subsequently, the control section 20 transmits, to the video data storage section 30, control command so as to read out video data of plural frames (15 frames in this case) within the designated N-th GOP (step S73).

The video data storage section 30 which has received this control command reads out video data of 15 frames within the designated N-th GOP to output it to the decoder 41 (step S74).

The decoder 41 expands the compressed video data corresponding to one GOP outputted from the video data storage section 30 to output non-compressed video data of 15 frames to the frame memory 43 (step S75).

Then, the control section 20 controls the address generator 42 to write, into the frame memory 43, the non-compressed video data of 15 frames outputted from the decoder 41 (step S76).

Then, the control section 20 sets M=0 (step S77) and further sets L=0 (step S78). Namely, M, L are as follows. Since, in this embodiment, 1 GOP consists of 15 frames and three times speed reproduction is designated as explained with reference to FIG. 13, values to which numbers are allocated in order with video data corresponding to three frames which are read out from the video data storage section 30 being as one set are M, and values to which numbers are allocated in order to one set of three image frames are 1. Accordingly, M takes values of 0 to 4 and L takes values of 0 to 2.

Further, the control section 20 sets parameter D indicating how video data stored in the frame memory 43 are read out with respect to the address generator 42 (step S79). In this instance, e.g., D=(fn=3M+L+1, Hinit=0, Hincr=1, Hleng=H, Vinit=0, Vincr=3, Vleng=H) is set. Namely, parameter for carrying out read-out operation from address initial value (0, 0) with respect to the first GOP up to addressing range (H, H) by incremental quantity (1, 3) with respect to video data stored in the frame memory 43 is given to the address generator 42.

The address generator 42 which has received this parameter D reads out video data stored in the frame memory 43 on the basis of this parameter D to output the data which has been read out to the video interface section 44 (step S80).

Then, the control section 20 increments value of L (step S81).

Further, the control section 20 judges whether or not value of L incremented at the step S81 is 3 (step S82). In this case, when value of L is not 3, the processing returns to the step S79. Thus, the above-described processing will be repeated.

On the other hand, when value of L is 3 at the step S82, the control section 20 controls the video interface section 44 so as to add synchronizing (sync.) signal to data which has been read out from the frame memory 43 to output it as a video signal to the external (step S83).

Then, the control section 20 increments value of M (step S84).

Further, the control section 20 judges whether or not value of M incremented at the step S84 is 5 (step S85). In this case, when value of M is not 5, the processing returns to the step S78. Thus, the above-described processing are repeated.

On the other hand, when value of M is 5 at the step S85, the control section 20 increments value of N to designate the next GOP (step S86). The processing returns to the step S73. Thus, the above-described processing will be repeated.

As explained above, in accordance with this invention, such an approach is employed to divide reproduction picture into plural areas in dependency upon reproduction speed to allocate frame image of video data to these areas to generate reproduction image to display it to thereby have ability to display all frames without thinning them. Accordingly, it becomes possible to correctly recognize image content also with respect to high speed reproduction.

What is claimed is:

1. A video data reproducing apparatus adapted for reading out data including video data stored with respect to a non-linear accessible recording medium the apparatus comprising:

reproduction video dividing means such that in the case where the video data which has been read out from the recording medium is outputted to the external as n (n>1) times speed video data, when n is integer, it divides output image 1 frame by n, while when n is not integer, it divides output image 1 frame by m (m is integral part of n: n=m. . . . ); and reproduction image generating means for allocating n frames or m frames of the video data which has been read out from the recording medium to the output image 1 frame divided by n or divided by m to generate reproduction image.

2. A video data reproducing apparatus as set forth in claim 1, wherein the reproduction image generating means allocates portions different from each other of respective frames of the n frames or the m frames of the video data which has been read out from the recording medium to divided respective portions of the output image 1 frame to generate reproduction image.

3. A video data reproducing apparatus as set forth in claim 1, wherein the reproduction image generating means contracts respective frames of the n frames or the m frames of the video data which has been read out from the recording medium to allocate them to respective portions of the output image 1 frame to generate reproduction image.

4. A video data reproducing apparatus as set forth in claim 1, wherein the reproduction image generating means inserts divisional line between respective areas of the output image 1 frame divided by n or divided by m to generate reproduction image.

5. A video data reproducing apparatus as set forth in claim 1, wherein the non-linear accessible recording medium is a RAID in which hard disk drives each comprised of plural hard disks are arranged.

6. A video data reproducing method for reading out data including video data stored with respect to a non-linear accessible recording medium the method comprising:

a first step such that in the case where the video data which has been read out from the recording medium is outputted to the external as n (n>1) times speed video data, when n is integer, output image 1 frame is divided by n, while when n is not integer, output image 1 frame is divided by m (m is integral part of n: n=m. . . . );

a second step of allocating n frames or m frames of the video data which has been read out from the recording medium to the output image 1 frame divided by n or divided by m to generate reproduction image; and a third step of outputting, as n times speed video data, data indicative of the reproduction image generated at the second step.

7. A video data reproducing method as set forth in claim 6, wherein, at the second step, a procedure is taken to allocate portions different from each other of respective frames of the n frames or the m frames of the video data which has been read out from the recording medium to divided respective portions of the output image 1 frame to generate reproduction image.

8. A video data reproducing method as set forth in claim 6, wherein, at the second step, a procedure is taken to contract respective frames of the n frames or the m frames of the video data which has been read out from the recording medium to allocate them to respective portions of the output image 1 frame to generate reproduction image.

9. A video data reproducing method as set forth in claim 6, wherein, at the second step, a procedure is taken to insert divisional line between respective areas of the output image 1 frame divided by n or divided by m to generate reproduction image.

10. A video data reproducing method as set forth in claim 6, wherein the non-linear accessible recording medium is a RAID in which hard disk drives each comprised of plural hard disks are arranged.

* * * * *